United States Patent Office 2,796,582
Patented June 18, 1957

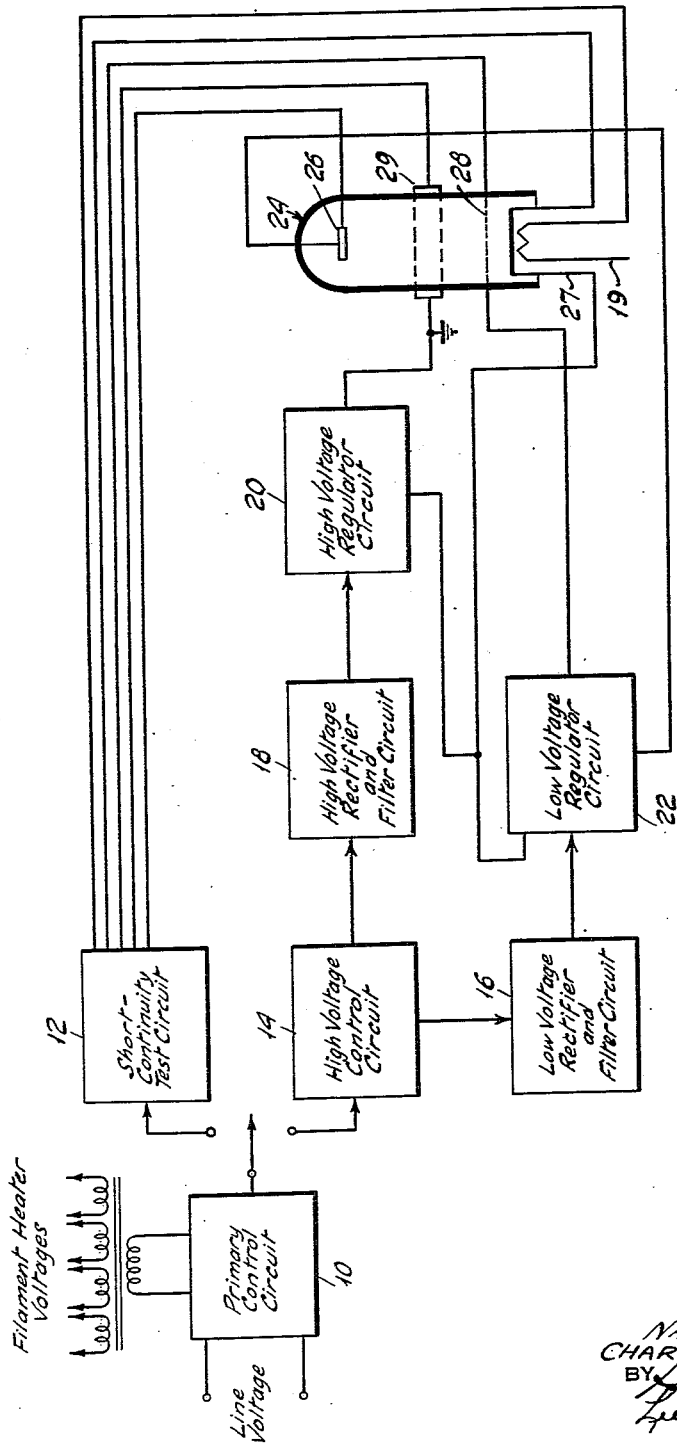

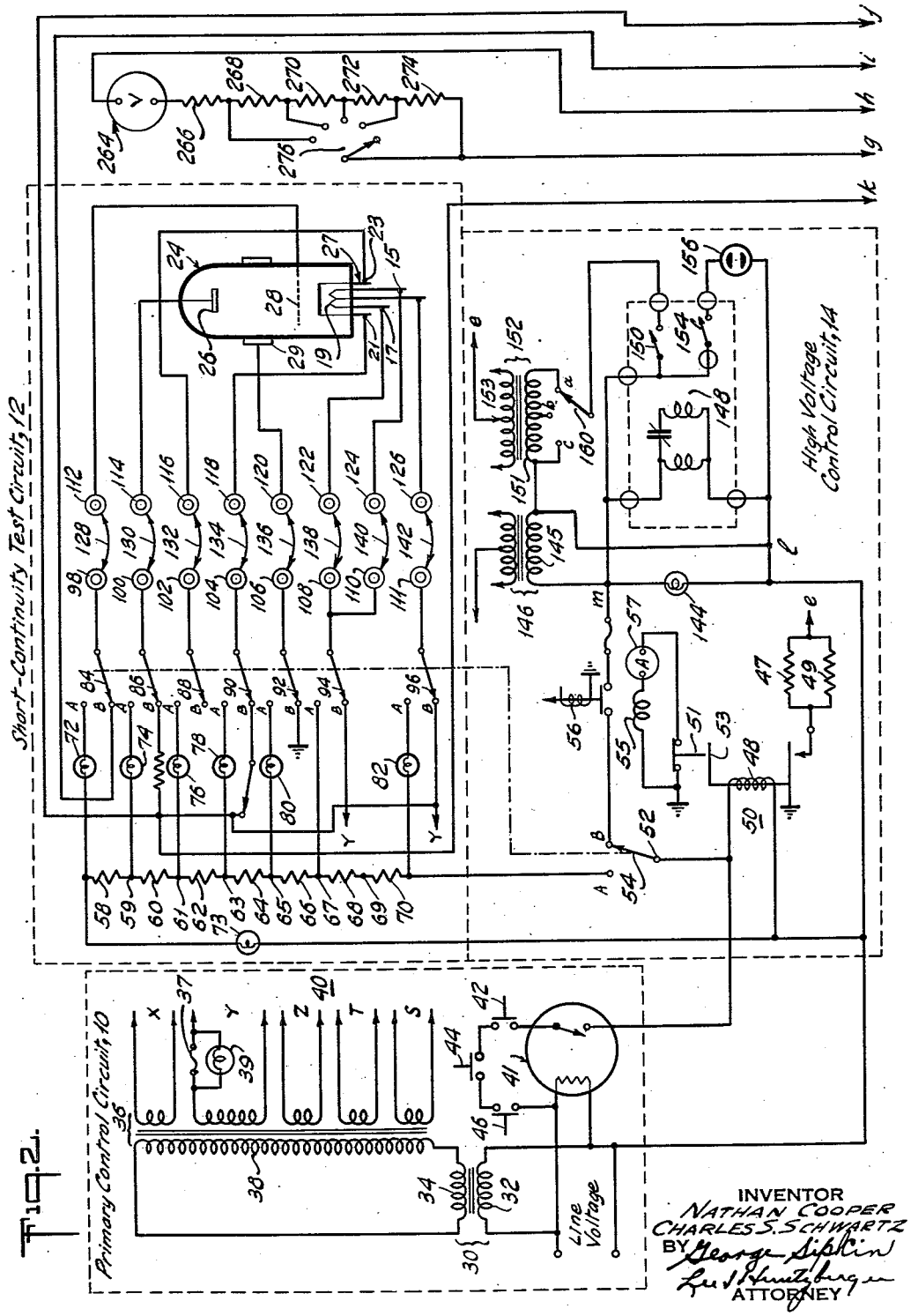

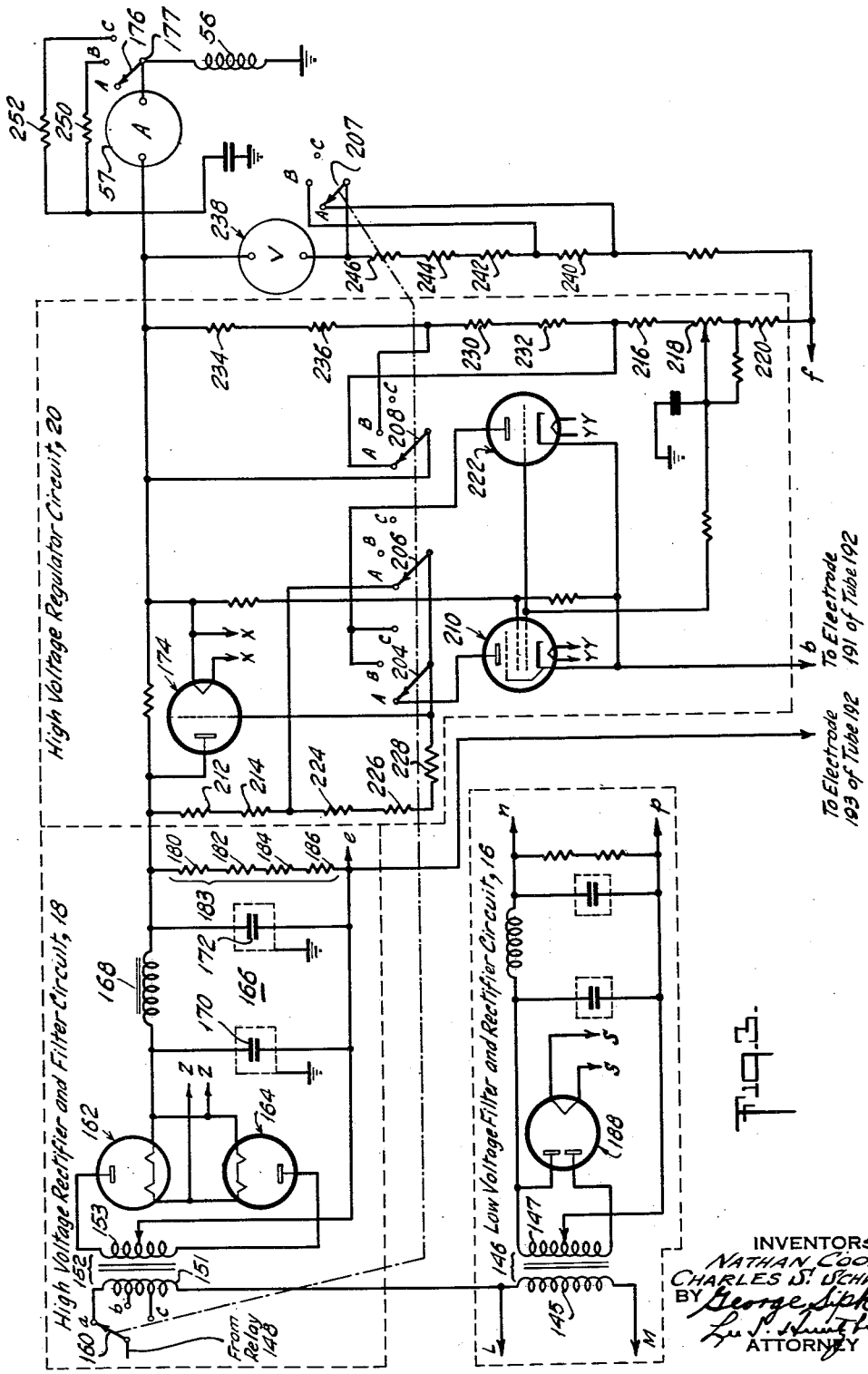

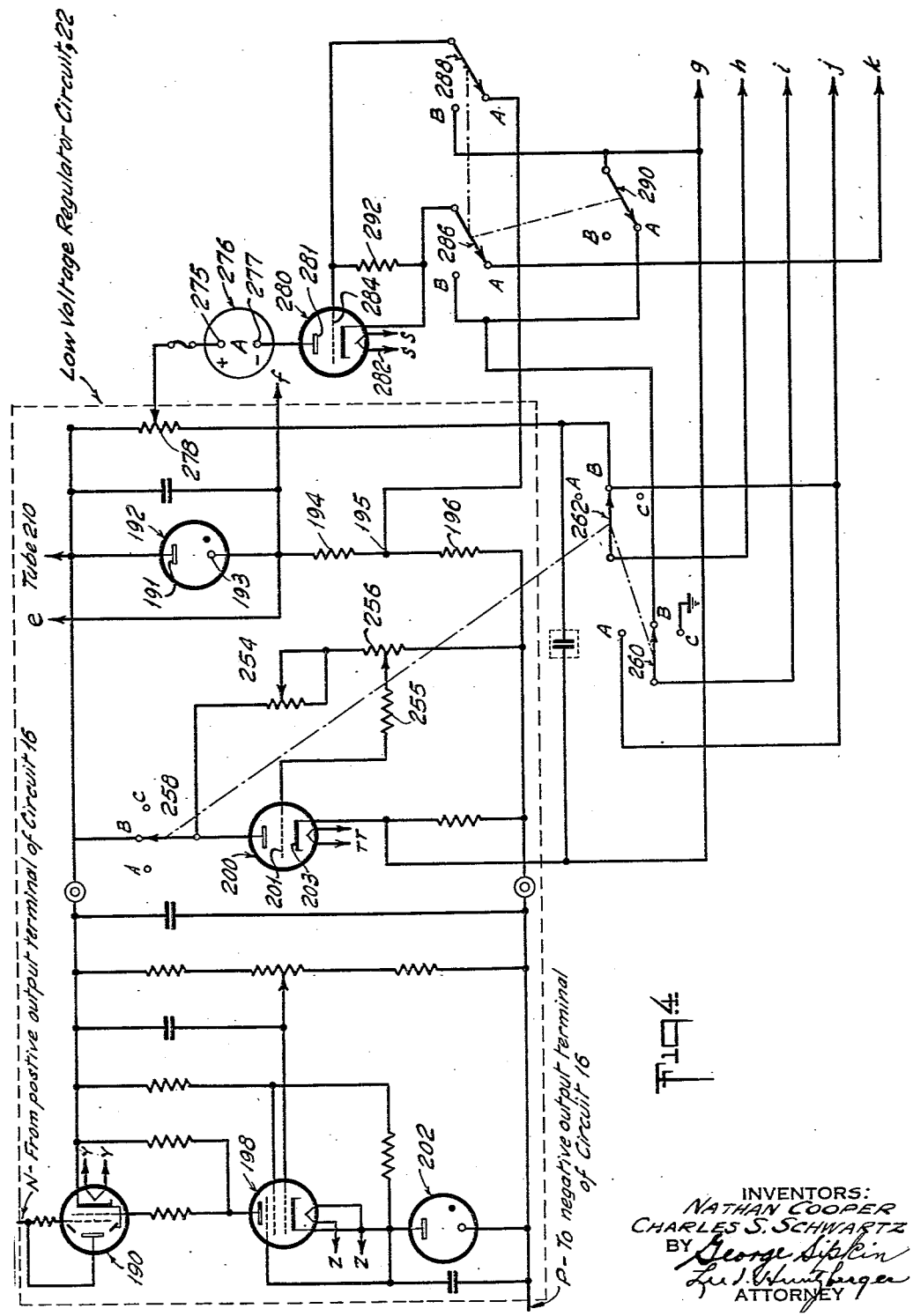

2,796,582

KLYSTRON TUBE TESTER

Nathan Cooper, Brooklyn, and Charles S. Schwartz, White Plains, N. Y.

Application July 27, 1955, Serial No. 524,832

3 Claims. (Cl. 324—22)

(Granted under Title 35, U. S. Code (1952), sec. 266)

The invention described herein may be manufactured and used by or for the Government of the United States of America for governmental purposes without the payment of any royalities thereon or therefor.

This invention relates to tube testers and more particularly, to an apparatus for testing klystron tubes.

In the development of high frequency circuitry, klystrons have been used extensively as oscillators, amplifiers and detectors. Several specific klystron tubes have been developed, each of which has its operating characteristics. The extensive use of klystrons has brought forth the need of a klystron tube tester which is capable of checking this type tube as to any deviation from its standard design characteristics. Such a tester should be capable of supplying a very high accelerating voltage and electrode voltages which must be highly regulated to ensure that the voltages which are applied are the same as those that the design calls for. Furthermore, since there are several different type klystron tubes, the apparatus should be capable of supplying specific regulated electrode voltages over a wide range so that most of all the varieties of klystron tubes can be tested. Obviously, such voltages can be supplied by different regulated power supplies for each set of design values. However, a plurality of power supplies would result in a cumbersome, prohibitively expensive apparatus of complex design and would be very difficult to operate. Since a tube tester is usually designed for use by an operator with little technical background and since high accelerating voltages are characteristic of klystrons, the apparatus should be safe to operate with a minimum of precautions.

It is, accordingly, the primary object of the present invention to provide an apparatus for testing klystron tubes which includes single regulated high voltage and low voltage power supplies, which is capable of supplying electrode potentials for a wide variety of klystron tubes, and which is safe to operate.

It is a further object to provide an apparatus for testing klystron tubes which is adapted for testing shorts between the klystron electrodes, emission current and degree of gas present in the tube.

A feature of the present invention resides in the grounding of the shell of the klystron and the application of a high negative potential to the cathode to provide the beam or accelerator voltage.

Another feature resides in the application of the regulated low voltage to a voltage regulator tube of an electronic high voltage regulator circuit so that the voltage regulator tube draws most of its current from a regulated supply without power waste and the possibility of a reference voltage variation with load voltage is eliminated.

A third feature resides in the selective interchangeability between a pentode voltage amplifier and a triode amplifier and variability within limits of the control grid and plate resistors thereof when a greater voltage is supplied from a high voltage rectifier circuit.

A fourth feature resides in the means for varying the klystron grid voltage negative or positive with respect to the cathode thereof.

Still another feature resides in a gas measuring circuit wherein an inverter amplifier is utilized to control the gas current through a sensitive current ammeter so that where excessively gassy klystron tubes are encountered, the greater the amount of gas current present, the less current passes through the meter.

In accordance with the present invention, there is provided an apparatus for testing klystron tubes having an emitting electrode, a control electrode, a normally grounded shell and a repeller electrode. It comprises a regulated high voltage supply having first positive and negative terminals and a regulated low voltage supply having second positive and negative terminals. Control means is provided which is adapted to be coupled to the input of the high and low voltage supplies for applying line voltage thereto and for applying line voltage between at least two of the klystron electrodes. First switch means is provided for coupling the control means to the klystron electrodes when in a first position and for coupling the control means to the low and high voltage supply inputs when in a second position whereby the potential at the first negative terminal is applied to the emitting electrode. A first series arrangement connected across the output of the low voltage supply includes in consecutive order a voltage regulator tube having one electrode connected to the second positive terminal and its other electrode connected to the first negative terminal and first and second resistors having a junction point therebetween. A third variable resistor is connected across the voltage regulator tube. A second series arrangement is provided which comprises in order a first vacuum tube having at least a first plate, grid and cathode, and a fourth cathode resistor with a fifth variable resistor connected between the first plate and grid, the fifth variable resistor providing a range of potentials at the first cathode. First means are provided for indicating the range of voltages at the first cathode. Second switch means are provided for connecting the second series arrangement across the output of the low voltage supply, for applying the potential at the first cathode to the klystron control electrode, and for connecting the first cathode to the first voltage indicating means. There is also included a second vacuum tube having at least a second plate, grid and cathode, and a first current indicating means, the second plate being connected to a point on the third variable resistor through the first current indicating means. A sixth grid leak resistor is connected between the second grid and cathode. Third switch means is utilized, when in a first position, for applying simultaneously the potential at the junction point to the repeller electrode and to the second grid and for applying the potential at the first cathode to the second grid when in a second position. There is also provided second voltage indicating means connected across the high voltage supply and second current indicating means connected between the positive terminal of the high voltage circuit and ground.

Other objects and many of the attendant advantages of this invention will be readily appreciated as the same becomes better understood by reference to the following detailed description when considered in connection with the accompanying drawings wherein:

Fig. 1 is a block diagram of a klystron tube tester constructed in accordance with the present invention; and Figs. 2, 3, and 4 are three parts of an electrical schematic illustrating diagrammatically in detail the circuits comprising the tester in Fig. 1. Lower case letters have been utilized to indicate lead connections on the separate figures.

In testing a klystron tube for shorts between electrodes and filament continuity, cathode emission and gas-leakage currents, it is necessary that two sets of voltages be brought to the tube. One is a relatively low alternating current voltage for the short-continuity test and other is a relatively high direct current voltage for measuring the cathode emission and gas leakage current test.

Referring now to Fig. 1, there is represented klystron tube tester which comprises a primary control circuit 10 for applying selected portions of the line alternating current voltage as heater voltages to the filaments of the several electronic discharge devices in the tester for a predetermined period. The output of primary circuit 10 may be selectively coupled either to a short, continuity test circuit 12 or a high voltage control circuit 14 by a suitable switch substantially as shown. In high voltage control circuit 14, the line voltage is applied to the primary winding of a transformer, whose secondary winding supplies the input voltage to the low voltage rectifier and filter circuit 16, and the line voltage is also applied to the primary winding of a transformer coupled to the high voltage rectifier and filter circuit 18. The output of circuit 18 is applied to a high voltage regulator circuit 20 which furnishes the beam voltage potentials and the cathode 27 potential for the klystron tube schematically depicted and designated by the numeral 24. The high voltage regulator circuit 20 is also coupled to the low voltage regulator circuit 22 whose input is coupled to output of the low voltage rectifier and filter circuit 16. Low voltage regulator circuit provides the potentials for the repeller 26 and the control grid 28 of klystron tube 24. The short continuity test circuit 12 is utilized to indicate those klystron tubes under test wherein there is physical contact between electrodes and to indicate the presence or lack of filament continuity. As is shown, with the present invention, the klystron shell 29 is grounded.

Referring now to Fig. 2, there is shown a source of alternating current voltage which preferably consists of line voltage and a constant voltage transformer 30. The leads of the primary winding 32 of transformer 30 are preferably connected to a source of alternating current line voltage so that the device may be energized from the usual 115 volt alternating current lighting circuit. The secondary winding 34 of transformer 30 is electrically connected in series with the primary winding 38 of a transformer 36 having a multiplicity of secondary windings generally indicated by the numeral 40. Secondary windings 40 are utilized to supply discrete constant heater voltages independent of line voltage variations for the filaments of the several electronic discharge devices included in the invention and for the klystron tube under test. Since it may be desirable to have an initial filament warmup period, a thermostatic delay type relay 41 is provided which closes after a predetermined period, i. e., such as about one minute, thus delaying the application of the line voltage during the warmup period. High voltage switches 42, 44, and 46 may be utilized as interlocks to apply voltage to high voltage transformers only if safety precautions are met thus protecting the operator using the device from touching a high voltage point.

The voltage is applied through thermostatic relay 41 to the coil 48 of a high voltage discharge relay 50 and to the pole 52 of a suitable switch 54. The voltage may also be applied to a blower motor (not shown) or other cooling device if it is desired to cool the klystron under test. Associated with coil 48 is an armature 53 and a suitable microswitch 51 having one grounded pole which during operation, serves to remove the ground from the high voltage supply. Microswitch 51 is in series with an overload relay 56 and a suitable indicating instrument such as a milliammeter adapted to emission current as will be further explained herein below.

When the connector of switch 54 is in the A position, the line voltage is applied through the connector of switch to the short-continuity test circuit 12. The line alternating current voltage, usually about 115 volts is applied to a circuit comprising a bleeder consisting of resistors 58, 60, 62, 64, 66, 68 and 70 in series with an electric light bulb 73 such as a 75 watt bulb. Tapped off the bleeder are indicator lamps 72, 74, 76, 78, 80, and 82 which may be selectively connected to the electrodes of the tube under test. The indicator lamps are respectively connected to the electrodes of the tube under test through the connectors of suitable selector switches 84, 86, 88, 90, 92, 94 and 96, a first series of terminals 98, 100, 102, 104, 106, 108, 110 and 111, a second series of terminals 112, 114, 116, 118, 120, 122, 124 and 126 and the jumpers 128, 130, 132, 134, 136, 138, 140 and 142 between the terminals. Switches 84, 86, 88, 90, 92, 94 and 96 with switch 54 are actually all part of an eight pole 2 position switch so that when the output of primary control circuit 10 is applied to short-continuity test circuit 12 through the connector of switch 54, the connectors of switches 84, 86, 88, 90, 92, 94 and 96 also assume position A. The jumper terminals provide a universal method of bringing any electrode potential to the corresponding tube electrode independent of its pin number. In circuit 12, when the connectors of switches 84, 86, 88, 90, 92, 94, and 96 are in the A position, grid 28 is placed in series with lamp 73 through terminal 112, jumper 128, terminal 98, the connector of switch 84 and bulb 72. Repeller 26 is connected through terminal 114, jumper 130, terminal 100, the connector of switch 86 and bulb 74 to the junction point 59 of resistors 58 and 60. One cathode terminal 23 is connected through terminal 116, jumper 132, terminal 102, the connector of switch 88 and lamp 76 to the junction point 61 of resistors 60 and 62. A second cathode terminal 21 is connected through terminal 118, jumper 134, terminal 104, the connecter of switch 90 and bulb 78 to the junction point 63 of resistors 62 and 64. The shell 29 is connected through terminal 120, jumper 136, terminal 106, the connector of switch 92 and bulb 80 to the junction point 65 of resistors 64 and 66. One filament terminal 17 is connected through terminal 122, jumper 138, terminal 108, and the connector of switch 94 to the junction point 67 of resistors 66 and 68. The other filament terminal 15 is connected through terminal 124, jumper 140, terminal 110 and the connector of switch 94 also to junction point 67. The short-continuity test circuit 12 is so arranged that if a short should occur between any two elements of klystron tube 24 at least one of bulbs 72, 74, 76, 78, 80 and 82 would glow. For example, assuming there were a short between grid 28 and filament 19, resistors 58, 60, 62, 64 and 66 would be shorted so that bulb 72 would glow. On the other hand, if a short existed between grid 28 and repeller 26, only resistor 58 would be shorted and both bulbs 72 and 74 would glow. In the case of the grid-filament short, more current would tend to flow than in the case of a grid-repeller short because of the decrease of resistance in the circuit. This would tend to make the bulbs glow with varying brightness in different cases. To ensure uniform brightness in all situations, the non-linear tungsten element of light bulb 73 is used as a ballast. As the current tends to increase in cases like a grid-filament short, the resistance of the tungsten element increases, thereby limiting the current and keeping the brightness uniform. If the filament 19 of the klystron tube 24 under test is continuous, voltage is applied through it, thereby illuminating bulb 82 indicating filament continuity. To test for a filament short, the connectors of switches 94 and 96 have to be in the B position. In that case, the filaments are connected to the heater voltage source, secondary winding section Y of transformer 36. In the event that a filament short exists, fuse 37 opens and the filament voltage lights a short indicator bulb 39. As stated hereinbefore, filament voltages for the tester are supplied by the filament transformer 36 and are stabilized by the constant voltage transformer 30. There are five secondary windings X, Y, Z, T and S with suitable ratings. The klystron tube 24 generally operates at a filament voltage of 6.3 volts A. C. which is supplied by secondary winding Y.

When the connectors of switches 54, 84, 86, 88, 90, 92, 94 and 96 are placed in the B position, the line voltage is applied through the contacts of overload relay 56 to the high voltage lamp 144 to the primary winding 145 of the low voltage circuit transformer 146 and to the terminals of a sequential delay relay 148. Delay relay 148 is set so that after a first shorter period for example, thirty seconds, contacts 150 close and voltage is then applied to the primary winding 151 of the high voltage transformer 152. The klystron tube under test may now be checked for gas and emission as will be outlined in further detail herein below. If the klystron is gassy, a gas cleanup time is required which is accomplished by the second setting of relay which is for a second longer period, for example 3 minutes. Thus three minutes after line voltage is applied to the terminals of relay 148, contacts 154 close causing a gas timer such as a neon bulb 156 to glow, thus informing the operator that the tube is to be discarded if it is still gassy. Should the emission current exceed a predetermined figure, say 125 milliamperes because of high voltage breakdown or extreme gassiness of the tube, the contacts of overload relay 56 will open shutting off all high voltage circuits.

When a tube has been checked, high voltage switches 44, 46 and 42 may be deactivated to remove voltage from high voltage control circuit 14. Line voltage, consequently, is immediately disconnected from transformers 146 and 152, the solenoid 48 of discharge relay 50 is deenergized permitting its plunger to travel the necessary distance to contact the parallel arrangement of discharge resistors 47 and 49 and the voltage supply is thus shorted to ground. With this arrangement, dangerous voltages are removed from the tube under test in a very short period, viz. less than one second. The plunger of relay 50 also deactivates microswitch 51 shorting a gas emission indicating meter 57 and relay 56 in circuit therewith during the period of surge discharge currents. Also, when the high voltage control circuit is deenergized, the blower stops, high voltage indicator lamp 144 is extinguished and sequential delay relay 148 resets for another timing cycle. Now, when high voltages switches 42, 44 and 46 are closed, high voltage discharge relay 50 is reenergized immediately removing the high voltage supply and emission indicating meter shorts. Sequential delay relay 148 permits the first shorter filament warmup period for the next tube under test before applying high voltage to the tube. During this warmup period, the tube may be checked for shorts and filament continuity as outlined above.

A cathode emission test is a check on the ability of the klystron gun structure to emit an electron stream of a magnitude compatible with the oscillator RF power requirements. The measurement of cathode emission should be made with typical operating voltages. The performance as to this test may be judged either on the value of cathode current with a fixed grid voltage or the value of positive control grid voltage required to obtain a fixed cathode current.

The gas leakage current test consists in taking the current flowing to an electrode negative with respect to the cathode as a measure of the gas present. In the case of a reflex klystron, the current flowing to the negative repeller electrode may be read. In the case of double cavity klystrons which have no repeller electrode, the normally negatively operated control grid may be used for gas leakage current test purposes.

The high voltage or beam supply in the tester preferably should satisfy the power requirements of a wide variety of klystron tube types. This necessitates a substantial voltage range which is regulated for variations in line voltage and load currents to eliminate equipment for individual tube types. Typical voltage and current ranges that may be necessary are as follows:

*Voltage and current ranges*

1. Low: −225 to −700 volts D. C., 65 ma. max.
2. Medium: −700 to −1400 volts D. C., 65 ma. max.
3. High: −1400 to −3400 volts D. C., 25 ma. max.

The maximum variation in output voltage for a 10% line voltage variation and specified load current variations are preferably as follows:

Low: −700 volts, 0%, 20 to 60 ma. load current variation
−225 volts, 1%, 20 to 60 ma. load current variation
Medium: −1400 volts, 1%, 20 to 60 ma. load current variation
−700 volts, 0%, 20 to 60 ma. load current variation
High: −3400 volts, 5%, 5–25 ma. load current variation
−1400 volts, 0%, 5–25 ma. load current variation As shown in Fig. 3 in high voltage control circuit 14, the primary winding 151 of high voltage transformer 152 has intermediate spaced taps designated by lower case letters *a*, *b*, and *c*. When the connector of a switch 160 is in the *a* position, the output of the high voltage circuit will be the lowest, when it is in the *c* position, it will be the highest and when it is in the *b* position, the voltage will have a magnitude intermediate that at position *a* and *c*. The output of the center tapped secondary winding 153 of transformer 152 is applied to a high voltage rectifier and filter circuit 18, which comprises half wave rectifier diodes 162 and 164. The latter provide a full wave output to a pi-filter 166 comprising inductance 168 and shielded grounded capacitors 170 and 172. The filtered output is connected to pass through the plate-cathode path of a power triode 174 in the high voltage regulator circuit 20, through a suitable current indicating meter 57, and through the coil of overload relay 56 to ground through pole of a switch 176. A bleeder 183 comprising series arrangement of resistors 180, 182, 184 and 186 is connected across the output of filter 166.

Low voltage rectifier and filter circuit 16 comprises a full wave rectifier 188 whose plates are driven by the center tapped secondary winding 147 of transformer 146. The filtered output of circuit 16 is connected to pass through the plate cathode path of a beam power pentode 190 of low voltage regulator circuit 22, shown in Fig. 4, through a voltage regulator VR90 tube 192 having electrodes 191 and 193, through a voltage divider comprising resistors 194 and 196, to the center tap of the secondary winding 145 of transformer 146. Pentodes 190 and 198, triode 200 and voltage regulator tube 202 and their associated circuit elements comprise the conventional electronic voltage regulator and their description is believed to be unnecessary.

Referring back to high voltage rectifier circuit 18, in Fig. 3, it is seen that point *e* of bleeder 183 is connected to electrode 193 of voltage regulator tube 192 (Fig. 4). Circuit 20 is a conventional voltage regulator circuit. However, three position switches 204, 206, and 208 ganged with switch 160 make possible the voltage regulation of a wide voltage range. For example, when the connectors of switches 160, 204, and 206 are in the A position, the tubes in the circuit are triode power tube 174, a pentode voltage amplifier 210 and voltage regulator tube 192. The plate resistors of pentode 210 when the switches are in this position are resistors 212 and 214 and the grid bias voltage therefor is provided by resistors 216, 218, and 220. When the connectors of switches 160, 204, 206 and 208 are in the B position, a higher voltage is provided in the secondary winding 153 of transformer 152 and the high voltage drop across the voltage amplifier of regulator circuit 20 necessitates the substitution of a triode 222 for pentode 210. The plate resistors of tube 222 comprise resistors 212, 214, 224, 226 and 228 and the bias voltage for the grid of tube 222 is developed across resistors 230, 232, 216, 218 and 220. When switches 160, 204, 206 and 208 are in the C position, a still higher voltage is provided through the secondary winding 153 of transformer 152. Grid bias voltage for tube 222 is developed across the entire bleeder comprising resistors 234, 236, 230, 232, 216, 218 and 220, the plate resistors being the same as in position as in position B. To ensure a stable constant reference voltage, the voltage regulator tube 192 draws substantially all of its current from the regulated low voltage supply as will be explained herein below. With this arrangement, the power waste which would occur if the current for tube 192 were drawn from the high voltage supply is avoided. Also, there is eliminated a reference variation with load voltage.

As shown in Fig. 3, the voltage meter 238 is utilized to monitor the regulated high voltage employing appropriate multipliers inserted in circuit therewith by a three position switch 207 which is also ganged with switches 160, 204, 206 and 208. For example, when the connector of switch 207 is in the A position, multiplier resistors 240, 242, 244 and 246 are in series arrangement with meter 238. In the B position, only resistors 242, 244 and 246 are in series therewith and in the C position, no multiplier resistor is inserted in series with meter 238. The grounded meter 57 is a suitable ammeter for indicating the beam current in the klystron under test. By selectively inserting either resistor 250 or resistor 252 across meter 57 through the connector of switch 176, the beam current may be read on a designated scale on the meter.

The positive or negative control grid voltages for the klystron tube under test are obtained by varying the control grid on tube 200 of the low voltage regulator circuit 22, shown in Fig. 4. The resulting cathode voltage of tube 200 is utilized as the source of voltage bias for the control electrode 28 of the klystron tube under test. By means of adjustable resistors 254 and 256 and a grid current limiting resistor 255 in series arrangement with the grid 201 of tube 200, the bias voltage on grid 201 may be varied. Variable resistor 256 is so chosen to have a magnitude many times that of resistor 254 so that the former is utilized as the coarse adjustment and the latter as the fine adjustment. The voltage bias for grid 201 may be so chosen that the voltage applied from cathode 203 to electrode 28 of the klystron tube under test is equal to the voltage applied to the klystron cathode 27. Considering the arrangement of ganged switches 258, 260 and 262, it is seen that when the connectors thereof are in the B position the value of resistors may be so chosen that the same voltage is applied to the klystron control electrode 28 from cathode 203 as is applied to klystron cathode 27. By variably decreasing the magnitudes of resistors 254 and 256, grid 201 may be rendered variably negative with respect to cathode 203 and, consequently, a correspondingly negative klystron control electrode 28 bias voltage is provided which is negative with respect to klystron cathode 27. By increasing grid resistors 254 and 256, grid 201 may be operated with a positive voltage with respect to cathode 203 and a variable klystron control electrode 28 voltage which is positive with respect to klystron cathode 27 voltage is provided. Fine control resistor 254 is particularly useful in testing klystron tubes having small control electrode bias voltages.

To measure klystron control electrode bias voltage accurately over a wide range of positive and negative values, when it is operated at a voltage other than the klystron cathode voltage, there is provided a suitable indicating device such as voltmeter 264 (shown in Fig. 2) which is in series with cathode 203 when the connectors of switches 258, 260 and 262 are in the B position. Switch 276 is provided to selectively insert one or more multiplier resistors 266, 268, 270, 272 and 274 in series with meter 264.

To indicate gas present in the klystron tube under test, a gas test circuit is provided. The circuit comprises a suitable ammeter 276 having a first terminal 275 connected to a point on a variable resistor 278 connected across voltage regulator tube 192, the other terminal 277 being connected to the plate 281 of a high-mu triode 280, the cathode 282 and grid 284 of tube 280 being respectively connected to the center poles of a two position switch 286 and a two position switch 288. Switches 286 and 288 are ganged with a third two position switch 290. A resistor 292 is connected across cathode 282 and grid 284.

It is to be noted that in testing klystron tubes with the apparatus of the present invention, the gas test circuit has to be inserted in the repeller line of a reflex klystron, i. e., with the connectors of switches 286, 288 and 290 in the A position. Ammeter 276 which is used to indicate the gas current necessarily has to have a sensitive movement since the permissible gas current limit for any klystron is quite small, about seven microamperes. However, an excessively gassy klystron tube may draw several milliamperes. It is, therefore, necessary that the gas test circuit be such that ammeter 276 is protected. In ammeter 276, gas current is indicated by a down scale reading. Thus, an infinite gas current results in a zero ammeter reading. Consequently, ammeter 276 is sensitive to small currents, say from 0 to 10 microamperes and is not damaged by gassy klystrons. When the connectors of switches 286, 288, and 290 are in the A position, a voltage which is negative with respect to the klystron cathode voltage is applied from the junction point 195 of resistors 194 and 196 to the repeller 26 of the klystron tube under test and to grid 284 of tube 280. An adjustable positive voltage is applied from a point on resistor 278 to plate 281. Tube current then flows through the series circuit consisting of resistor 292, tube 280 and ammeter 276. Resistor 292 should preferably have a high resistance value so that an effective voltage bias is provided for grid 284 when small gas currents flow. This limits the tube current to only a few microamperes which may be utilized as a full scale deflection value for ammeter 276. If gas is present in the klystron tube under test, gas current flows through resistor 292 to the klystron repeller 26 increasing the negative voltage bias on grid 284 and reducing the plate current of tube 280. Thus, it is seen that tube 280 serves as an inverter so that the greater the gas current, the less current flows through ammeter 276. It is to be noted that when switches 286, 288, and 290 are in the A position, and switches 258, 260 and 262 are in the B position, the klystron control electrode voltage is brought directly to switch 260 through switch 290. When switches 286, 288 and 290 are in the B position, and switches 258, 260 and 262 are in the B position, the klystron control electrode voltage is brought to the gas circuit comprising meter 276 and tube 280 and associated circuit elements and then to switch 260. In these positions, the repeller voltage terminates on switch 288.

Switches 286 and 288 selectively place resistor 292 in series with the klystron repeller voltage from junction point 195 or the klystron control electrode voltage from cathode 203 of tube 200 depending upon whether gas is to be measured in the repeller of a reflex klystron or in the grid of a double cavity klystron which has no repeller electrode.

In considering the operation of the present invention, referring back to the high voltage rectifier and regulator circuits 18 and 20 of Fig. 3, it is seen that due to the comparatively low resistance of triode power tube 174 and grounded ammeter 57, the plate of tube 174 is slightly positive with respect to ground and point e is at a relatively high negative potential. The voltage at point e is applied to the cathode 27 of the klystron tube under test so that a potential difference of comparatively large magnitude exists between the grounded shell 29 and the cathode 27. This potential difference provides the beam voltage in testing the klystron tubes.

Obviously many modifications and variations of the present invention are possible in the light of the above teachings. It is therefore to be understood that within the scope of the appended claims the invention may be practiced otherwise than as specifically described.

We claim:

1. An apparatus for testing klystron tubes having an emitting electrode, a control electrode, a normally grounded shell and a repeller electrode comprising a regulated high voltage supply having a first positive and a first negative terminal; a regulated low voltage supply having a second positive and a second negative terminal; control means adapted to be coupled to the input of said high and low voltage supplies for applying line voltage thereto and for applying line voltage between at least two of said klystron electrodes; first switch mean for coupling said control means to said klystron electrodes in a first position and for coupling said control means to the inputs of said high and low voltage supplies in a second position whereby the potential at said first negative terminal is applied to said klystron emitting electrode when said switch means is in said second position; a first series arrangement connected across the output of said low voltage supply and including in order, a voltage regulator tube having one electrode connected to said second positive terminal and its other electrode connected to said first negative terminal, a first resistor and a second resistor having a junction point therebetween; and a third variable resistor connected across said voltage regulator tube; a second series arrangement comprising in order a first vacuum tube having at least a first plate, grid and cathode, a fourth cathode resistor, and a fifth variable resistor connected between said first plate and grid; said fifth variable resistor providing a range of potentials at said first cathode; first means adapted for indicating the range of voltage at said first cathode; second switch means for connecting when in a first position said second series arrangement across the output of said low voltage supply for simultaneously applying the potential at said first cathode to said klystron accelerating electrode, and for connecting said first cathode to said first indicating means; a second vacuum tube having at least a second plate, grid and cathode; first current indicating means, said second plate being connected to a point on said third variable resistor through said first current indicating means, a sixth resistor connected between said second grid and cathode, third switch means for simultaneously applying the potential at said junction point to said repeller electrode and to said second grid when in a first position and for applying said first cathode potential to said second grid in a second position, second voltage indicating means connected across said high voltage supply; and second current indicating means connected between said first positive terminal and ground.

2. An apparatus as defined in claim 1 wherein said high voltage supply comprises a voltage rectifier and filter circuit and a voltage regulator circuit having its input coupled to the output of said rectifier and filter circuit.

3. An apparatus as defined in claim 2 wherein said voltage regulator circuit includes a power triode having at least a plate, grid and cathode, a pentode voltage amplifier and a triode voltage amplifier, and further comprises switch means for selectively providing a plurality of different voltage outputs from said high voltage power supply and for simultaneously selectively coupling said pentode voltage amplifier to said power triode grid at least when the lowest of said output voltages is provided and for coupling said triode voltage amplifier to said power triode at least when the highest of said output voltages is provided.

References Cited in the file of this patent
UNITED STATES PATENTS
2,632,134   Reid ------------------ Mar. 17, 1953